(12) United States Patent
Dey et al.

(10) Patent No.: US 11,488,026 B2
(45) Date of Patent: Nov. 1, 2022

(54) METHOD AND SYSTEM FOR PARTITIONING OF DEEP CONVOLUTION NETWORK FOR EXECUTING ON COMPUTATIONALLY CONSTRAINT DEVICES

(71) Applicant: Tata Consultancy Services Limited, Mumbai (IN)

(72) Inventors: Swarnava Dey, Kolkata (IN); Arijit Mukherjee, Kolkata (IN); Arpan Pal, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 755 days.

(21) Appl. No.: 16/535,668

(22) Filed: Aug. 8, 2019

(65) Prior Publication Data
US 2020/0143254 A1 May 7, 2020

(30) Foreign Application Priority Data
Nov. 2, 2018 (IN) .............................. 201821041652

(51) Int. Cl.
*G06N 3/10* (2006.01)
*G06N 3/04* (2006.01)
*G06N 3/08* (2006.01)
*H04L 41/142* (2022.01)

(52) U.S. Cl.
CPC ................ *G06N 3/10* (2013.01); *G06N 3/04* (2013.01); *G06N 3/08* (2013.01); *H04L 41/142* (2013.01)

(58) Field of Classification Search
CPC ... G06N 3/10; G06N 3/04; G06N 3/08; H04L 41/142
See application file for complete search history.

(56) References Cited

U.S. PATENT DOCUMENTS

| | | |
|---|---|---|
| 10,778,412 B2 * | 9/2020 | Chen .................. G06K 15/1886 |
| 2017/0277658 A1 | 9/2017 | Pratas et al. |
| 2018/0189652 A1 | 7/2018 | Korthikanti et al. |
| 2018/0315153 A1 * | 11/2018 | Park ...................... G06V 40/10 |
| 2018/0315155 A1 * | 11/2018 | Park ...................... G06N 3/063 |
| 2019/0251694 A1 * | 8/2019 | Han ........................ G06T 7/11 |
| 2020/0117993 A1 * | 4/2020 | Martinez-Canales ......... G06N 10/00 |

* cited by examiner

*Primary Examiner* — Minh Chau Nguyen
(74) *Attorney, Agent, or Firm* — Finnegan, Henderson, Farabow, Garrett & Dunner, LLP

(57) ABSTRACT

A growing need for inferencing to be run on fog devices exists, in order to reduce the upstream network traffic. However, being computationally constrained in nature, executing complex deep inferencing models on such devices has been proved difficult. A system and method for partitioning of deep convolution neural network for execution of computationally constraint devices at a network edge has been provided. The system is configured to use depth wise input partitioning of convolutional operations in deep convolutional neural network (DCNN). The convolution operation is performed based on an input filter depth and number of filters for determining the appropriate parameters for partitioning based on an inference speedup method. The system uses a master-slave network for partitioning the input. The system is configured to address these problems by depth wise partitioning of input which ensures speedup inference of convolution operations by reducing pixel overlaps.

15 Claims, 8 Drawing Sheets

(a) Dominating computation (b) Higher communication

METHOD AND SYSTEM FOR PARTITIONING OF DEEP CONVOLUTION NETWORK FOR EXECUTING ON COMPUTATIONALLY CONSTRAINT DEVICES

PRIORITY CLAIM

This U.S. patent application claims priority under 35 U.S.C. § 119 to Indian Application No. 201821041652, filed on Nov. 2, 2018. The entire contents of the aforementioned application are incorporated herein by reference.

TECHNICAL FIELD

The embodiments herein generally relates to the field of fog computing. More particularly, but not specifically, the invention provides a system and method for partitioning of deep convolution network for executing on computationally constraint devices.

BACKGROUND

In recent years industries and research organizations have heavily invested in Fog Computing where computational methods are placed closer to the data sources at the edge of the network. Data analytic applications processing large volume of sensor data, images, videos, sounds etc. to generate inferences are primary candidate applications for such a processing architecture as processing the data closer to the source ensures less data traffic upstream. Example implementations of data analytic applications in Smart City are available in smart city transport systems, smart city healthcare, detection of illegal garbage dumping and several others. It is noteworthy that many of the above mentioned and several other data analytic applications for smart city are adopting Deep Learning (DL)/Inference techniques due to availability of state of the art learning models ready for transfer learning and fine tuning, resulting in faster time to market.

Deep Learning is a method of machine learning (ML) for classification/regression/encoding. Target of any supervised ML algorithm is deriving a mathematical function that can map input data to desired output, given a dataset where the desired output is specified. Such dataset are man-made and called labeled data. For learning using such dataset/data stream, input data is segmented into suitable units and is processed/transformed to obtain a set of features that can represent and discriminate the different classes in the input data. The process of feature extraction is critical to the success of a ML implementation and requires domain knowledge, significant skill and effort. ML engineers skilled in the art, can apply different mathematical, statistical methods along with domain knowledge to extract features from labeled data. A typical Deep Learning algorithm trains a neural networks (NN) based model using the labeled data and that model can be used later to classify/predict other sets of data, not processed by the model. The NN graph used for Deep Learning typically consist of a set of layers where each layer contains a set of nodes.

Pre trained models like ResNet, VGG, Inception have shown high accuracy for image classification in ILSVRC. These models can be used in other domains/data by transfer learning and fine tuning. Sending full input data over network is costly and slow. Further challenges of running top of the line deep models like Inception, Resnet, and VGG in common edge/fog devices are the computational and memory requirements for each of the models. It was found that the Inception V3 model cannot be loaded into the available memory without allocating a USB based swap space in the Raspberry Pi 3 board and it takes nearly five seconds to classify a single image. The similar issues are there in most of the commonly used models.

Various other methods have been used, Edge computing have emerged significantly. The initial challenges in Fog and Edge Computing were mainly service standardization, integration of third party vendors, handling of confidential data (trust and privacy) and monetization. Further deep learning inference in constraint devices have also gained interest in last few years. The approaches include layer compression and layer-wise partitioning of deep neural networks, None of these prior works analyze the effect of handling high number input and output channels, which is the de facto standard in current SoA computational neural networks.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for partitioning of deep convolution network for execution of computationally constraint devices at a network edge. The system comprises an input module, a memory and a processor in communication with the memory. The input module obtains input data from a plurality of master devices, wherein the plurality of master devices are present at the network edge. The input module also provides a number of convolution filters with a predefined filter depth. The processor further comprises a runtime estimation module, a container registration module, an indices generation module, a model partitioning module, a partitioned data transfer module, a convolution module, a merging module and a sending module. The runtime estimation module estimates a runtime to run a basic unit operation of deep convolution operations by each of the plurality of master devices. The container registration module checks a container registry and calculate if speedup inference is achievable using the estimated runtime. The indices generation module generates depth-wise indices for performing partitions based on an input and output depth of a convolution filter and the container registry. The model partitioning module partitions the input data and the deep convolution operations by the plurality of master devices for a first network layer of the deep convolution network based on the number of convolution filters and the filter depth. The partitioned data transfer module transfers the partitioned input data and the deep convolution operations to a plurality of slave devices. The convolution module executes a distributed convolution algorithm on the plurality of slave devices. The merging module merges results of the algorithm executed on the plurality of slave devices. The sending module sends the convolutional results to a second network layer, wherein the second network layer is next to the first network layer.

In another aspect the embodiment here provides a method for partitioning of deep convolution network for execution of computationally constraint devices at a network edge. Initially, an input data is obtained from a plurality of master devices, wherein the plurality of master devices are present at the network edge. In the next step, a runtime is estimated to run a basic unit operation of deep convolution operations by each of the plurality of master devices. Further, a container registry checked and calculate if speedup inference is achievable using the estimated runtime. In the next step, depth-wise indices are generated for performing partitions based on an input and output depth of a convolution filter and the container registry. A number of the convolution filters are then provided with a predefined filter depth. In the next step, the input data and the deep convolution operations are partitioned by the plurality of master devices for a first network layer of the deep convolution network based on the number of convolution filters and the filter depth. Further, the partitioned input data and the deep convolution operations are transferred to a plurality of slave devices. In the next step, a distributed convolution algorithm is executed on the plurality of slave devices. In the next step, results of the algorithm executed on the plurality of slave devices are merged. And finally, the convolutional results are sent to a second network layer, wherein the second network layer is next to the first network layer.

In yet another embodiment, one or more non-transitory machine readable information storage mediums comprising one or more instructions is provided. The one or more instructions when executed by one or more hardware processors causes the one or more hardware processors to perform a method for partitioning of deep convolution network for execution of computationally constraint devices at a network edge, the method comprising a processor implemented steps of obtaining input data from a plurality of master devices, wherein the plurality of master devices are present at the network edge; estimating a runtime to run a basic unit operation of deep convolution operations by each of the plurality of master devices; checking a container registry and calculate if speedup inference is achievable using the estimated runtime; generating depth-wise indices for performing partitions based on an input and output depth of a convolution filter and the container registry; providing a number of the convolution filters with a predefined filter depth; partitioning the input data and the deep convolution operations by the plurality of master devices for a first network layer of the deep convolution network based on the number of convolution filters and the filter depth; transferring the partitioned input data and the deep convolution operations to a plurality of slave devices; executing a distributed convolution algorithm on the plurality of slave devices; merging results of the algorithm executed on the plurality of slave devices; and sending the convolutional results to a second network layer, wherein the second network layer is next to the first network layer.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
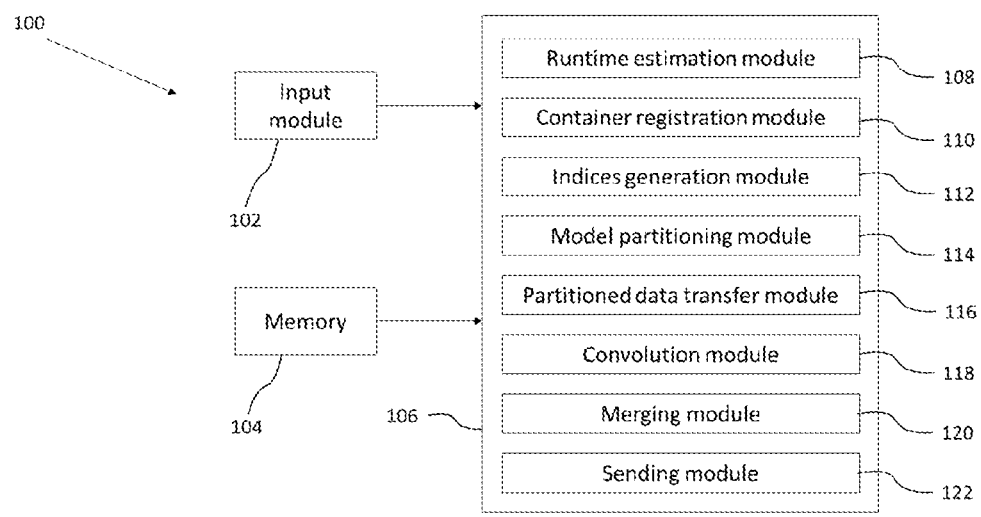
FIG. 1 illustrates a block diagram of a system for partitioning of deep convolution network for execution of computationally constraint devices at a network edge according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

According to an embodiment of the disclosure, a system 100 for partitioning of deep convolution network for execution of computationally constraint devices at a network edge is shown in the block diagram of FIG. 1. The system 100 is configured to use depth wise input partitioning of convolutional operations in deep convolutional neural network (DCNN). The convolution operation is performed based on an input filter depth and number of filters for determining the appropriate parameters for partitioning based on an inference speedup method, which can run on computationally constrained devices at the edge of the network. The system 100 is feasible to operate on any pre trained available state Of Art (SOA) deep convolutional neural network (DCNN) models, which is achieved by depth wise partitioning of input based on input filter depth and number of filters among the available computationally constrained devices. The system 100 uses a master-slave network for partitioning the input. The master slave network comprises a plurality of master devices and a plurality of slave devices. The plurality of slave devices are the devices which are computationally constrained devices and carry out convolutional operations on partitioned data. The plurality of master devices are the devices which act as data source of the input and partition the input among the plurality of slave devices.

The proposed system 100 and method solves the problem of standard partitioning methods of row or column or grid partitioning which overlap the pixels and reduces efficiency of the system and are not adaptable to pre trained deep convolutional neural networks (DCNN). The system 100 is configured to address these problems by depth wise partitioning of input (as generally input size>>filter kernel size) which ensures speedup inference of convolution operations by reducing pixel overlaps. As the recent DCNNs are having small spatial size but high depth, partitioning the input based on filter depth ensures speedup inference of convolution operations.

According to an embodiment of the disclosure, the system 100 further comprises an input module 102, a memory 104 and a processor 106 as shown in the block diagram of FIG. 1. The processor 106 works in communication with the memory 104. The processor 106 further comprises a plurality of modules. The plurality of modules accesses the set of algorithms stored in the memory 104 to perform certain functions. The processor 106 further comprises a runtime estimation module 108, a container registration module 110, an indices generation module 112, a model partitioning module 114, a partitioned data transfer module 116, a convolution module 118, a merging module 120 and a sending module 122.

According to an embodiment of the disclosure the input module 102 is configured to obtain input data from the plurality of master devices, wherein the plurality of master devices are present at the network edge. The input data is a set of 2D matrices, these matrices are referred as feature maps (FM) and the number of feature maps are considered as channels or depth. An example of depth is R, G and B planes of an image input. The input module 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the processor 106 further comprises the runtime estimation module 108. The runtime estimation module 108 is configured to estimate a runtime to run a basic unit operation of deep convolution operations by each of the plurality of master devices. In an example the runtime estimation module 108 can also be known as offline benchmarking module 108. The runtime 'γ' is estimated using a set of deep learning (DL) algorithm on all the available computationally constrained devices (slaves). The run time 'γ' of each device to carry out convolutional operations is influenced by parameters like processor clock speed, memory, cache memory, bus width, load average, floating point operations per second. The determined run time 'γ' of each of the master devices is used in estimating the speedup inference of the complete convolutional operation of a given layer as explained in the later part.

Once the run time 'γ' of each device is estimated, then each of the slave device generates the light weight virtual computing devices, these devices are called containers. These containers may be virtual machines, Docker containers, LXC etc.

According to an embodiment of the disclosure, the processor 106 also comprises the container registration module 110. The generated containers are registered with master of the network. The container registration module 110 is configured to check a container registry and calculate if speedup inference is achievable using the estimated runtime. The master device (data source) considers all the available registered containers for partitioning (distributing) of the input data to carry out convolutional operations. The maximum speed up for a master-slave network is assessed by automatically adjusting the parameters such as the number of input channels, the number of output channels and are fixed for input depth-wise partitioning.

According to an embodiment of the disclosure, the processor 106 also comprises the indices generation module 112. The indices generation module 112 is configured to generate depth-wise indices for performing partitions based on an input and output depth of a convolution filter and the container registry. The convolutional filters are a set of 2D metrics referred as kernels and the number of input filters are considered as the input depth and the number of output filters are considered as the output depth.

According to an embodiment of the disclosure, the processor 106 comprises the model partitioning module 114. The model partitioning module 114 is configured to partition the input data and the deep convolution operations by the plurality of master devices for a first network layer of the deep convolution network based on the number of convolution filters and the filter depth. Further, the partitioning the convolution operations generates the start and end indices along the depth dimension so as the partitioning by master can be carried out online or offline.

The distribution of the input data and the convolutional model for the deep convolutional operations is based on estimating the speed up inference by considering run time of all the available constrained devices in the network so as to improve the speed up inference in DCNN which is determined by the equation (1) as explained in detail in the later part of this disclosure:

$$S = \frac{K^2 \cdot c \cdot f \cdot \gamma}{(c+f) \cdot \left(\frac{\alpha}{M} + \beta\right)} \quad (1)$$

Where, K is filter spatial dimensions, c number of input channels, f number of output channels, γ runtime to execute, a single packet transfer time, β per byte transmission time, M bytes of the packet.

The equation (1) is proposed equation to estimate the speedup of the convolution operations. The maximum speedup achievable by adding more and more edge workers for a distributed convolutional layer execution is bounded by the equation (1). The parameters of the equation are assumed to be K, c, f-->filter kernel spatial dimensions, the number of input channels and number output channels respectively. A ratio is calculated between estimated computation runtime and estimated communication time. Thus, the number of slave devices are considered to be large if the ratio is less than a pre-calculated number. In an example, the predefined number is 1. If this ratio is more than or equal to 1 then the number of salve devices are less. When the number of slave devices are small as per the previous ratio, then the real speedup is calculated as a ratio between the overall partitioned runtime and overall standalone runtime. Thus, if the input and output filter depth are large but there are less number of slave devices, then the above mentioned maximum speedup ratio cannot be used.

According to an embodiment of the disclosure, the processor 106 also comprises the partitioned data transfer module 116. The partitioned data transfer module 116 is configured to transferring the partitioned input data and the deep convolution operations to a plurality of slave devices;

According to an embodiment of the disclosure, the processor 106 comprises the convolution module 118. The convolution module 118 is configured to execute a distributed convolution algorithm on the plurality of slave devices. The input feature maps (IFMs) are convoluted with a set of kernel filters to generate the output feature maps (OFMs). These kernel filters are always of same depth as that of the input feature map (IFM). The filter kernel slides over the input feature map (IFM) horizontally, vertically to extract the 3D input feature map (IFM). These 3D input feature map (IFM) are flattened into 1D feature maps and proceeded depth wise horizontally to generate output feature map (OFM).

According to an embodiment of the disclosure, the processor 106 further comprises the merging module 120 and the sending module 122. The merging module 120 is configured to merge the results of the algorithm executed on the plurality of slave devices. The sending module 122 is then configured to send the convolutional results to a second network layer, wherein the second network layer is next to the first network layer.

According to an embodiment of the disclosure, the partitioning can be carried out either in offline mode or in online mode. In the offline mode, the details of the plurality slaves are known in advance and the convolution model can be partitioned on any computer and is deployed partially into the master and the slave devices and partitioning and transfer of data is carried out by master at runtime. While in the online mode, the plurality of slaves are identified dynamically that are available from the containers registered and master partitions both the model and the data at runtime, after which data and model are sent over the network to the slaves. But new slaves cannot dynamically added to the network once the convolutional operation is started.

Figure 2A:
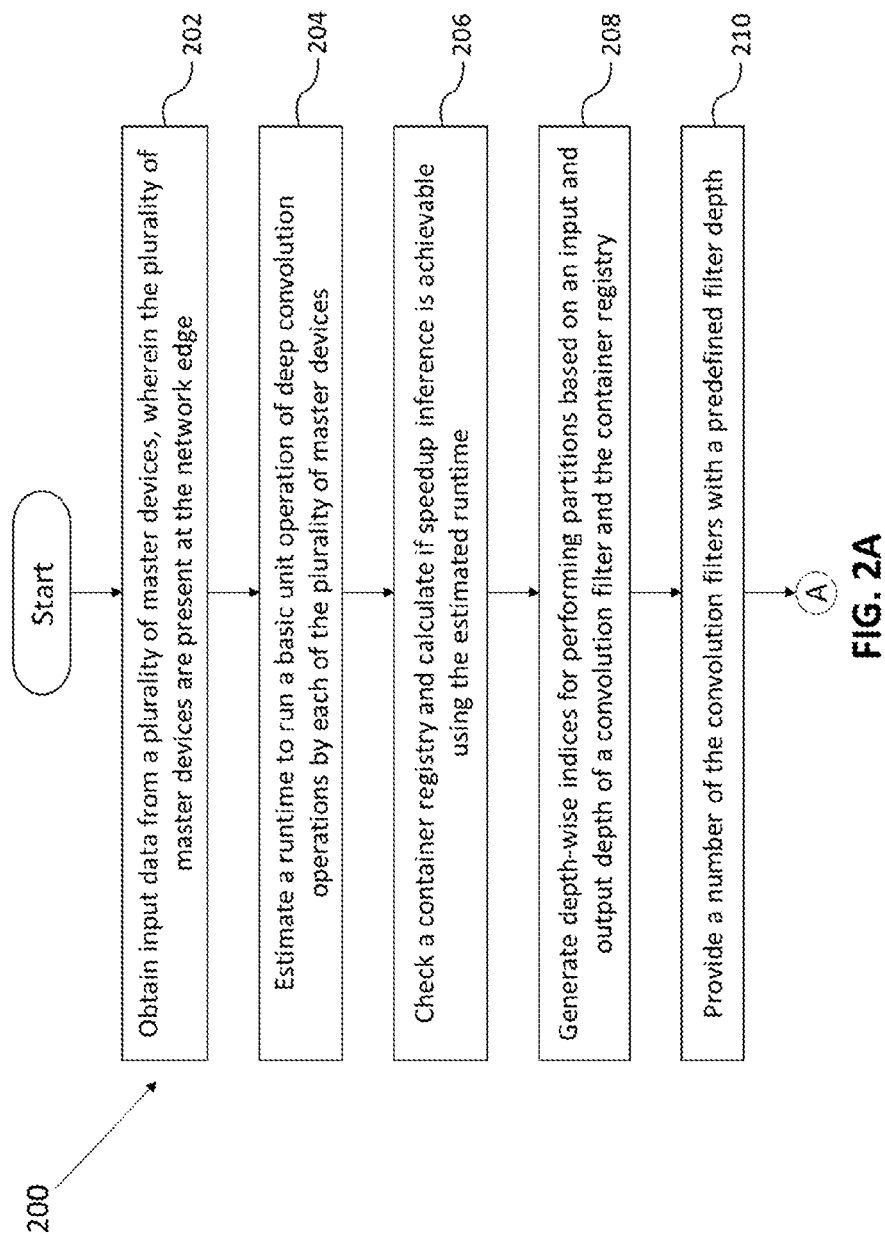
FIGS. 2A and 2B are a flowchart illustrating the steps involved in partitioning of deep convolution network for execution of computationally constraint devices at a network edge according to an embodiment of the present disclosure.
Figure 2B:
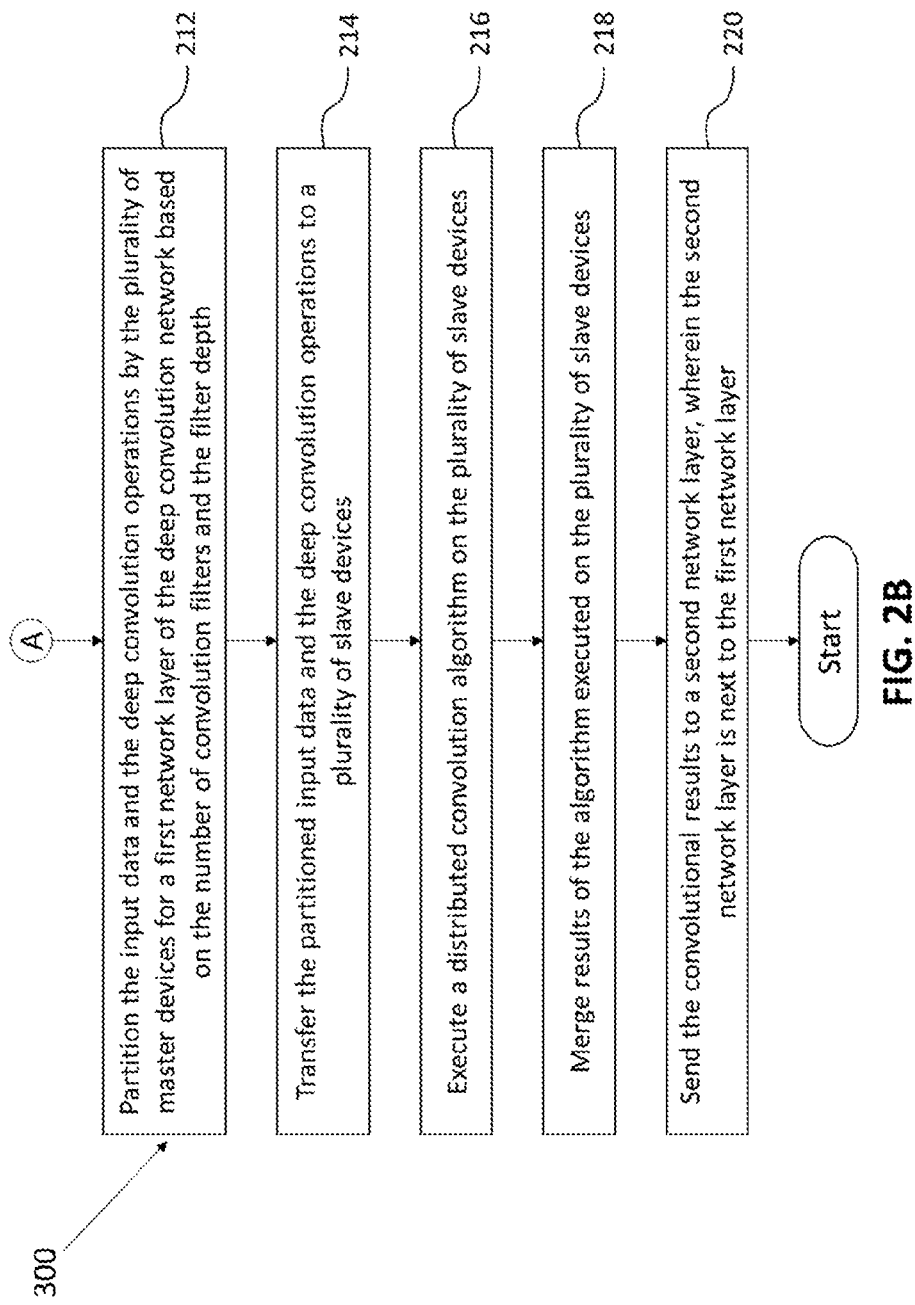

In operation, a flowchart 200 illustrating a method for partitioning of deep convolution network for execution of computationally constraint devices at a network edge is shown in FIG. 2A-2B. Initially at step 202, the input data is obtained from a plurality of master devices, wherein the plurality of master devices are present at the network edge. In the next step 204, the runtime is estimated to run the basic unit operation of deep convolution operations by each of the plurality of master devices. At step 206, the container registry is checked and it was calculated if speedup inference is achievable using the estimated runtime. The maximum speed up for a master-slave network is assessed by automatically adjusting the parameters such as the number of input channels, the number of output channels and are fixed for input depth-wise partitioning.

In the next step 208, the depth-wise indices are generated for performing partitions based on an input and output depth of the convolution filter and the container registry. At step 210, the number of the convolution filters are provided with the predefined filter depth. At step 212, the input data and the deep convolution operations are partitioned by the plurality of master devices for the first network layer of the deep convolution network based on the number of convolution filters and the filter depth. The partitioning the convolution operations generates the start and end indices along the depth dimension so as the partitioning by master can be carried out online or offline.

In the next step 214, the partitioned input data and the deep convolution operations is transferred to the plurality of slave devices. At step 216, the distributed convolution algorithm is executed on the plurality of slave devices. At step 218, the results of the algorithm executed on the plurality of slave devices are merged. And finally at step 220, the convolutional results are sent to the second network layer, wherein the second network layer is next to the first network layer.

According to an embodiment of the disclosure, the system 100 can also be explained with the help of a theoretical model for distributed execution of the convolution layers (CLs) used in deep convolution neural network (DCNN), especially considering the high number of input and output depth channels used in established convolution neural network (CNN) models.

Figure 3:
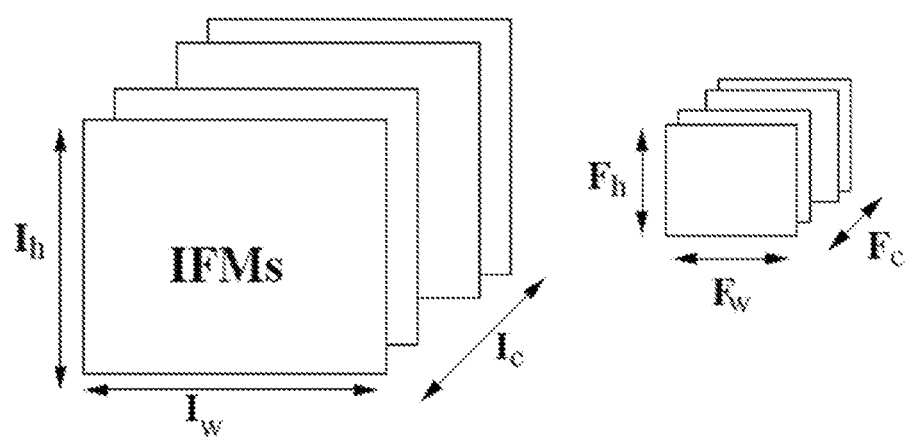
FIG. 3 shows input feature maps and one sample filter according to an embodiment of the disclosure.
Figure 4:
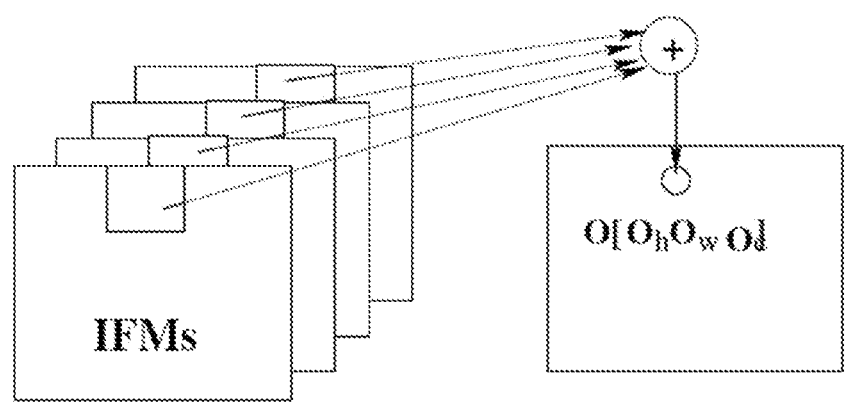
FIG. 4 shows convolution to generate on feature of an output feature maps according to an embodiment of the disclosure.
Figure 5:
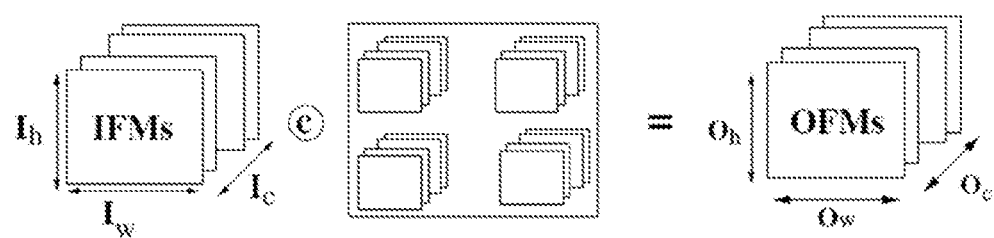
FIG. 5 shows each filter for generating one OFM channel according to an embodiment of the disclosure.

A typical convolutional layer (CL) in CNNs operate on a set of 2D matrices to produce another set of 2D matrices. The matrices are often referred to as Feature Maps (FMs) and the number of FMs in input/output space are called channels or depth. The input FMs (IFMs) are convoluted with a set of filter kernels to generate the output FMs (OFMs). FIG. 3 depicts a $I_h \times I_w \times I_c$ IFM and a single $F_h \times F_w \times F_c$ filter where h, w, c denotes height, width and depth channels. The dimensions of 2D filters are usually much smaller than the 2D IFMs. Each filter kernel has same depth as the input and generates one OFM from all IFMs. FIG. 4 shows the calculation of a single feature value of OFM at a particular depth and FIG. 5 show calculation of all OFMs. $o_h$, $o_w$, $o_c$ are given indices in height, width and depth dimensions of the OFMs, shaped $O_h \times O_w \times O_c$. $f_h$, $f_w$ are the indices along height, width of the filter kernels and $i_h$, $i_w$, $i_c$ are given indices in height, width and depth dimensions of the IFM. The formula for convolution calculation of a standard CL is given in equation (2):

$$OFM[o_h, o_w, o_c] = \sum_{I_c=1}^{I_c} \sum_{f_h=1}^{F_h} \sum_{F_w=1}^{F_w} F[f_h, f_w, i_c, o_c] \cdot IFM \ [o_h + f_h - 1, i_w + f_w - 1, i_c] \quad (2)$$

Equation (2) captures a 3D CL operation where each filter is placed at a particular location of the IFM and filter contents are element-wise multiplied with the corresponding contents of the IFM, at a matching depth (2D spatial convolutions). The products are then added along the depth axis (linear projections). The filter is scanned through the whole IFM in both vertical and horizontal directions and from each location of the IFM, where filter is placed, a 3D IFM patch is extracted. The number of IFM patches extracted is exactly $O_h \times O_w$. These patches are flattened into an 1D array of dimension $F_h \times F_w \times F_c$, where elements are arranged from top left location of the patch, taken depth-wise, proceeding horizontally. Each 3D filter is flattened in the same way. MATRIX 1 and MATRIX 2 below shows such flattened patches and filters.

| MATRIX 1: Sample 4 × 4 IFM and 2 × 2 filter with depth 2 | |
|---|---|
| Image patch d0 | Conv 1 is: |
| [[1. 3. 9. 5.] | [[25. 25. 44. 29.] |
| [6. 2. 1. 2.] | [78. 128. 127. 83.] |
| [5. 6. 7. 4.] | [62. 90. 81. 46.] |
| [1. 1. 5. 4.]] | [58. 89. 95. 65.]] |

-continued

MATRIX 1: Sample 4 × 4 IFM and 2 × 2 filter with depth 2

| Image patch d1 | Conv 2 is: |
|---|---|
| [[2. 4. 2. 6.]<br>[4. 9. 5. 7.]<br>[3. 1. 6. 4.]<br>[0. 3. 1. 9.]] | [[55. 59. 91. 42.]<br>[52. 102. 110. 65.]<br>[83. 67. 146. 45.]<br>[12. 53. 50. 45.]] |
| filter d0 is: | Composite Conv is: |
| [[4. 5. 5.]<br>[1. 3. 0.]<br>[1. 2. 5.]] | [[80. 84. 135. 71.]<br>[130. 230. 237.148.]<br>[145. 157. 227. 91.] |
| filter d1 is: | [70. 142. 145. 110.]] |
| [[2. 1. 6.]<br>[2. 3. 1.]<br>[4. 0. 5.]] | |

MATRIX 2: Sample unrolling of a 4 × 4 IFM and 2 × 2 filter with depth 2

| Kernel | Patches |
|---|---|
| [[4.]<br>[2.]<br>[5.]<br>[1.]<br>[5.]<br>[6.]<br>[1.]<br>[2.]<br>[3.]<br>[3.]<br>[0.]<br>[1.]<br>[1.]<br>[4.]<br>[2.]<br>[0.]<br>[5.]<br>[5.]] | [[[[0. 0. 0. 0. 0. 0. 0. 0. 1. 2. 3. 4. 0. 0. 6. 4. 2. 9.]<br>[0. 0. 0. 0. 0. 0. 1. 2. 3. 4. 9. 2. 6. 4. 2. 9. 1. 5.]<br>[0. 0. 0. 0. 0. 0. 3. 4. 9. 2. 5. 6. 2. 9. 1. 5. 2. 7.]<br>[0. 0. 0. 0. 0. 0. 9. 2. 5. 6. 0. 0. 1. 5. 2. 7. 0. 0.]]<br>[[0. 0. 1. 2. 3. 4. 0. 0. 6. 4. 2. 9. 0. 0. 5. 3. 6. 1.]<br>[1. 2. 3. 4. 9. 2. 6. 4. 2. 9. 1. 5. 5. 3. 6. 1. 7. 6.]<br>[3. 4. 9. 2. 5. 6. 2. 9. 1. 5. 2. 7. 6. 1. 7. 6. 4. 4.]<br>[9. 2. 5. 6. 0. 0. 1. 5. 2. 7. 0. 0. 7. 6. 4. 4. 0. 0.]]<br>[[0. 0. 6. 4. 2. 9. 0. 0. 5. 3. 6. 1. 0. 0. 1. 0. 1. 3.]<br>[6. 4. 2. 9. 1. 5. 5. 3. 6. 1. 7. 6. 1. 0. 1. 3. 5. 1.]<br>[2. 9. 1. 5. 2. 7. 6. 1. 7. 6. 4. 4. 1. 3. 5. 1. 4. 9.]<br>[1. 5. 2. 7. 0. 0. 7. 6. 4. 4. 0. 0. 5. 1. 4. 9. 0. 0.]]<br>[[0. 0. 5. 3. 6. 1. 0. 0. 1. 0. 1. 3. 0. 0. 0. 0. 0. 0.]<br>[5. 3. 6. 1. 7. 6. 1. 0. 1. 3. 5. 1. 0. 0. 0. 0. 0. 0.]<br>[6. 1. 7. 6. 4. 4. 1. 3. 5. 1. 4. 9. 0. 0. 0. 0. 0. 0.]<br>[7. 6. 4. 4. 0. 0. 5. 1. 4. 9. 0. 0. 0. 0. 0. 0.]]]] |

Figure 6:
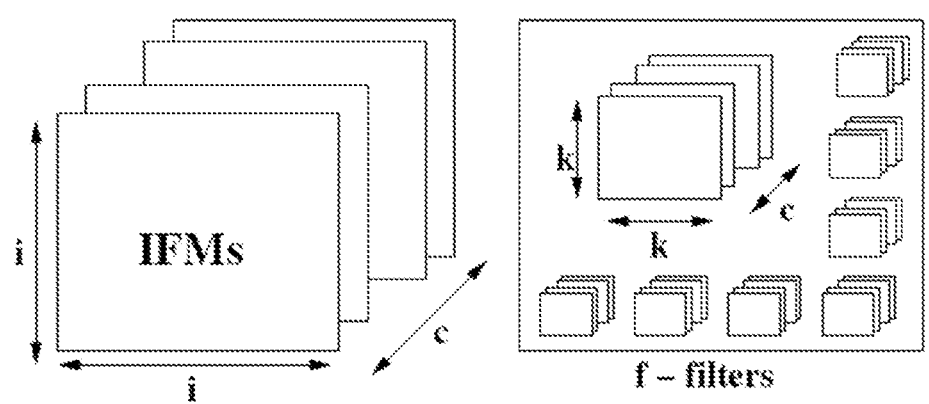
FIG. 6 shows input feature maps and sample f-filters according to an embodiment of the disclosure.
Figure 7:
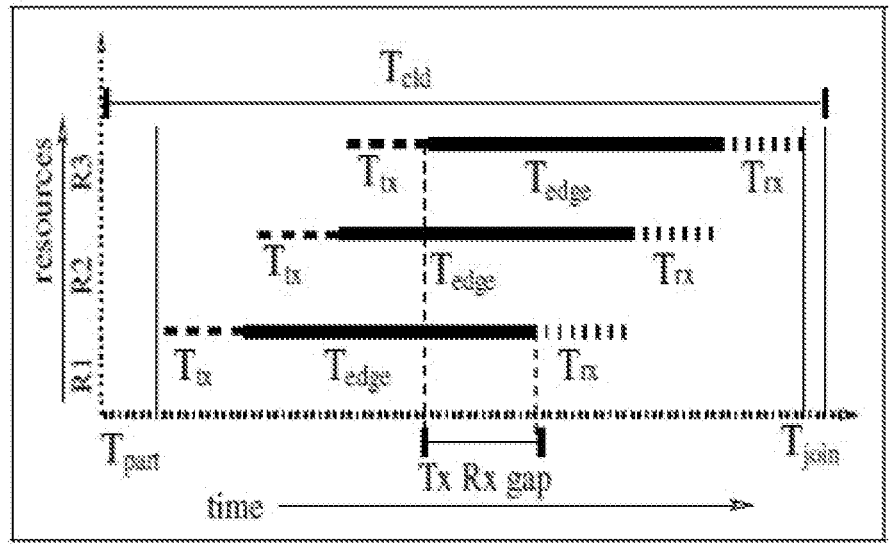
FIG. 7 shows a graphical representation of various distribution scenarios according to an embodiment of the disclosure.
Figure 7:
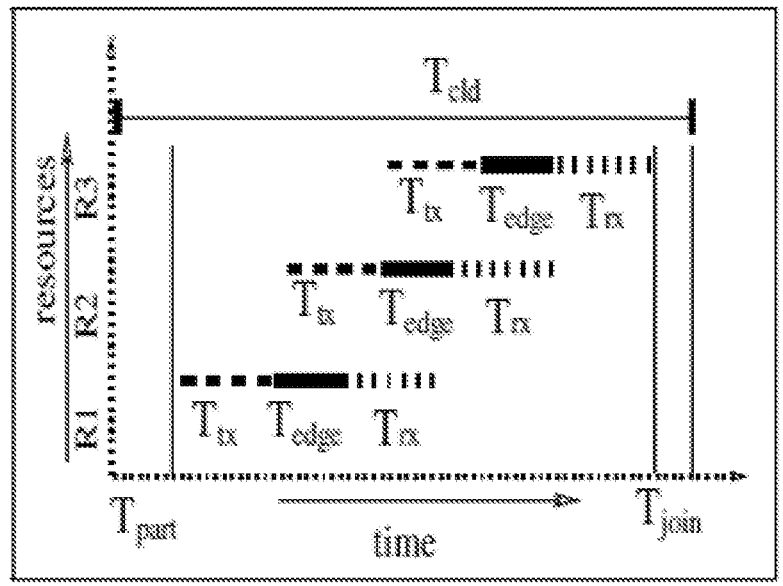

These two arrays are now multiplied element-wise and summed up. The time complexity of CL operation can be specified as $O_h \cdot O_w \cdot F_h \cdot F_w \cdot F_c \cdot O_c$, for all the filters. Without loss of generality, it was assumed that 1) the IFMs have same spatial dimensions as the OFMs, 2) the IFMs are square shaped—transforming the time complexity above to $I^2 \cdot K^2 \cdot c \cdot f$, where I, K, c, f are input spatial dimensions, filter spatial dimensions, number of input channels and number output channels respectively. FIG. 6 portrays such labeling for ease of understanding and further calculation.

Further, partitioning scheme is discussed as follows. Earlier works use row/column and grid based spatial image partitioning strategies for distributed execution of convolutions. An associated problem in that scheme is sending some extra entries along with the partitioned image. This overhead is due to the stride of the filter movement where the filter overlaps with the adjacent IFM entries that fall in another spatial partition of IFM. In this overhead is calculated as 7.8% for row based partitioning and 3.9% for grid based partitioning and 4.1% for heuristic partitioning. In state of the art CNNs the depth dimension has become important for achieving high accuracy. The prior works that look into distributed execution of image operations, like convolution on networked server and mobile grids, did not analyze the effect of handling high number input and output channels. Along with the increase in depth channels the kernel size is reduced and often kept around 3×3 in SoA CNNs, rendering the earlier analyses outdated. As an instance the TABLE 1 presents few notable CLs in Inception V3.

TABLE 1

Convolutional layers of Inception V3 showing

| Conv# | InCh | OutCh | IDim | KDim |
|---|---|---|---|---|
| Comv_1_1 | 32 | 32 | 149 | 3 |
| Conv_2_2 | 32 | 64 | 147 | 3 |
| Conv_4_4 | 80 | 192 | 73 | 3 |
| Mixed_3 | 288 | 384 | 35 | 3 |
| Mixed_8 | 768 | 192 | 17 | 1 |

In the present disclosure, an image and a filter was split along depth dimension for distribution among the Fog resources. Moreover all the filters are also distributed to the resources. This results in a non-loss partitioning and is different in principal from depth-wise separable convolutions, where the filter kernel is decomposed into bases filters and computational efficiency is achieved.

Further, performance modelling of distributed convolution layer is explained as follows. To model the performance of distributed execution of CLs, one computation step was defined as per equation (3), where a 2D spatial convolution is performed for a particular input and an output channel. This is a subset of equation (2), where convolution is performed for all input channels of a particular output channel.

$$OFM_{Int1}[o_h, o_w, o_c] = \sum_{f_h=1}^{K} \sum_{F_w=1}^{F_w} F[f_h, f_w, i_c, o_c] \cdot I[o_h + f_h - 1, o_w + f_w - 1, i_c] \quad (3)$$

As input IFM partitioning is performed on both in and out channel level, another basic computation step was defined where the 2D spatial convolutions generated from equation (3) are summed up along the depth axis. Such a step is defined in equation (4):

$$OFM_{Int2}[o_h, o_w, o_c] = \sum_{i_c=1}^{I_c} OFM_{Int1}[o_h, o_w, i_c] \quad (4)$$

Consider that the computation steps in equation (3) and takes runtime γ to execute and one summation between two $OFM_{Int1}$ layers, as defined in equation (3), takes A time to execute. The time taken to execute CL operation in a standalone mode is given by equation (5):

$$T_{cls} = I^2 \cdot K^2 \cdot c \cdot f \cdot \gamma \quad (5)$$

Considering the setup time for channel establishment for a single MTU packet (M bytes), transfer as a and per byte transmission time as β, the time taken to transmit P bytes of data is given by equation (6):

$$T_{comm} = \frac{P}{M} \cdot \alpha + P \cdot \beta \quad (6)$$

The distributed setup includes a master Edge device that partitions and distributes data (IFMs and Filters) and finally merges the partial solutions from the Edge workers. The input data was partitioned based on both input and output channels into n edge workers. It was assumed a homogeneous set of resources where the IFMs are equally distributed. This is a practicable assumption as lightweight virtual machines like containers, Dockers are available for edge platforms and can be extended to a capacity based partitioning in future.

The distributed execution would require time to 1) create partitioned IFMs along the channels ($T_{part}$) at the master Edge, 2) send partitioned IFMs to the Edge workers ($T_{tx}$), 3) time to calculate the intermediate OFMs at all Edge worker $T_{edge}$, 4) time to send back intermediate OFMs to the master Edge ($T_{rx}$) and 5) merging the intermediate OFMs input channel-wise (equation (3)) and concatenation of OFMs output channel-wise ($T_{join}$). The distributed execution model was followed, where two different scenarios may happen based on the communication and computation times.

As depicted in FIGS. 7a and 7b, the time taken to execute CL operation in a distributed fashion is given by equation (7):

$$T_{cld} = T_{part} + n \cdot (T_{tx} + T_{rx}) + T_{edge} + T_{join} \quad (7)$$

When the number of Edge workers (N) increase and the computation time $T_{edge}$ is comparatively small, the communication time determines the overall execution time of distributed CL and is specified using equation (8):

$$T'_{cld} = T_{part} + n \cdot (T_{tx} + T_{rx}) + T_{join} \quad (8)$$

Next the three major contributors were derived among these timings, and analyzing their operations:

1. $T_{tx}$: Given the size of the IFMs and filters and the fact that c/n input and f/n output channels were actually sent to each worker, which can be shown by equation (9)

$$T_{tx} = \frac{I^2}{M} \cdot \frac{c}{n} \cdot \alpha + I^2 \cdot \frac{c}{n} \cdot \beta + \frac{K^2}{M} \cdot \frac{c}{n} \cdot \frac{f}{n} \cdot \beta + K^2 \cdot \frac{c}{n} \cdot \frac{f}{n} \cdot \beta \quad (9)$$

2. $T_{edge}$: The time to compute at each Edge is summation of the time to do 2D spatial convolution for selected input channels of an IFM with set of filters assigned to that edge as shown in equation (10)

$$T_{edge} = \frac{I^2 \cdot K^2}{M} \cdot \frac{c}{n} \cdot \frac{f}{n} \cdot \gamma + \frac{c}{n} \cdot \frac{f}{n} \cdot \gamma \quad (10)$$

3. $T_{rx}$: Each edge worker sends back (f/n) 2D OFMs using the equation (11). The partitioning and joining time were ignored as those are very small compared to the above terms.

$$T_{rx} = \frac{I^2}{M} \cdot \frac{f}{n} \cdot \alpha + I^2 \cdot \frac{f}{n} \cdot \beta \quad (11)$$

Based on the above analysis and equation (7), the total execution time of distributed CL can be specified as shown in equation (12):

$$T_{cld} = n \cdot \left( \frac{I^2}{M} \cdot \frac{c}{n} \cdot \alpha + I^2 \cdot \frac{c}{n} \cdot \beta + \frac{K^2}{M} \cdot \frac{c}{n} \cdot \frac{f}{n} \cdot \alpha + K^2 \cdot \frac{c}{n} \cdot \frac{f}{n} \cdot \beta \right) + \quad (12)$$

-continued
$$\left( \frac{I^2 \cdot K^2}{M} \cdot \frac{c}{n} \cdot \frac{f}{n} \cdot \gamma + \frac{c}{n} \cdot \frac{f}{n} \cdot \lambda \right) + \left( \frac{I^2}{M} \cdot \frac{f}{n} \cdot \alpha + I^2 \cdot \frac{f}{n} \cdot \beta \right)$$

To derive the speedup S as $$\frac{T_{cls}}{T_{cld}},$$

equation (12) was simplified to $$\frac{K^2 c f \alpha}{n} \cdot \left( \frac{\alpha}{M} + \beta \right) + I^2 c \cdot \left( \frac{\alpha}{M} + \beta \right) + I^2 c \cdot \left( \frac{\alpha}{M} + \beta \right),$$

ignoring the term denoting computation time when n gets large (refer to equation (8)). This can be again simplified to $$I^2 c \cdot (c + f) \cdot \left( \frac{\alpha}{M} + \beta \right)$$

as the kernel size used in state of the art CNNs are kept very small (around 3×3) to reduce computation requirements, rendering the terms with K2 negligible compared to the IFMs. The maximum speedup achievable by adding more and more Edge workers for distributed CL execution is thus bounded by equation (1) as mentioned earlier $$S = \frac{K^2 \cdot c \cdot f \cdot \gamma}{(c + f) \cdot \left( \frac{\alpha}{M} + \beta \right)}$$

Therefore, from equation (1), it can be inferred that the speedup limit is not only dependent on the ratio of computation time to communication time, but also on the input and output depth. The input and output depth has maximum effect on S when both are equal.

Results

In the following model validation experiments first the parameters $\gamma$, $\alpha$, $\beta$ etc. were gathered as defined in previous section. The computation step was calculated using the equation (3) by measuring the full CL operation and then dividing by the operations (input×kernel×in channels). The computation time $\gamma$, estimated by us was around 0.001036 µs. The communication parameters were estimated by sending and receiving data between the Rpi boards over a Wi-Fi connection (802.11n, infrastructure). The estimated communication parameters are: $\alpha \approx 300$ µs, $\beta \approx 0.412$ µs and M≈2304 bytes.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problem of standard partitioning methods of row or column or grid partitioning. The disclosure provides a method and system for partitioning of deep convolution network for execution of computationally constraint devices at a network edge.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for partitioning of deep convolution network for execution of computationally constraint devices at a network edge, the method being implemented by a processor and comprising:
   obtaining input data from a plurality of master devices, wherein the plurality of master devices are present at the network edge;
   estimating a runtime to run a basic unit operation of deep convolution operations by each of the plurality of master devices;
   checking a container registry and calculate if speedup inference is achievable using the estimated runtime;
   generating depth-wise indices for performing partitions based on an input and output depth of a convolution filter and the container registry;
   providing a number of the convolution filters with a predefined filter depth;
   partitioning the input data and the deep convolution operations by the plurality of master devices for a first network layer of the deep convolution network based on the number of convolution filters and the filter depth;
   transferring the partitioned input data and the deep convolution operations to a plurality of slave devices;
   executing a distributed convolution algorithm on the plurality of slave devices;
   merging results of the algorithm executed on the plurality of slave devices; and
   sending the convolutional results to a second network layer, wherein the second network layer is next to the first network layer.

2. The method of claim 1, further comprising deriving a machine learning model using empirical results generated by a set of deep learning models ran on the cross section of the plurality of slave devices.

3. The method of claim 1, wherein partitioning is performed among the depth dimension.

4. The method of claim 1, wherein partitioning is performed in an online mode.

5. The method of claim 1, wherein partitioning is performed in an offline mode when the details of the containers of the plurality of slave devices are known in advance.

6. The method of claim 1, wherein the speedup is dependent on a combination of input and output depth of the convolution filter and the ratio of compute capability of the master-slave devices, the number of the plurality of slave devices and the bandwidth of the master-slave network.

7. The method of claim 1, wherein the runtime is dependent on one or more of a processor clock speed, memory, cache memory, bus width, load average or floating point operations per second.

8. The method of claim 1, wherein the convolutional filters comprise a set of 2D metrics referred as kernels and the number of input filters are considered as the input depth and the number of output filters are considered as the output depth.

9. The method of claim 1, wherein the input and output data comprise a set of 2D metrics referred as feature maps and the number of feature maps are considered as the depth.

10. The method of claim 1, wherein the number of slave devices are considered large if a ratio between estimated computation runtime and estimated communication time is less than a pre-calculated number.

11. The method of claim 1, wherein the maximum speed-up for a master-slave network is assessed by automatically using the number of filter input channels, number of filter output channels, filter kernel size, estimated computation runtime and communication time, when the number of slave devices is large.

12. The method of claim 1, wherein the real speed-up is calculated as a ratio between the overall partitioned runtime and overall standalone runtime, when the number of slave devices is small.

13. The method of claim 1, wherein the maximum speed-up for a master-slave network is used to decide if partitioning is required for high performance.

14. A system for partitioning of deep convolution network for execution of computationally constraint devices at a network edge, the system comprising:
an input interface configured to:
obtain input data from a plurality of master devices, wherein the plurality of master devices are present at the network edge, and
provide a number of convolution filters with a pre-defined filter depth;
a memory; and
a processor in communication with the memory, the processor configured to execute instructions stored in the memory to:
estimate a runtime to run a basic unit operation of deep convolution operations by each of the plurality of master devices;
check a container registry and calculate if speedup inference is achievable using the estimated runtime;
generate depth-wise indices for performing partitions based on an input and output depth of a convolution filter and the container registry;
partition the input data and the deep convolution operations by the plurality of master devices for a first network layer of the deep convolution network based on the number of convolution filters and the filter depth;
transfer the partitioned input data and the deep convolution operations to a plurality of slave devices;
execute a distributed convolution algorithm on the plurality of slave devices;
merge results of the algorithm executed on the plurality of slave devices; and
send the convolutional results to a second network layer, wherein the second network layer is next to the first network layer.

15. A non-transitory computer readable medium having a computer readable program embodied therein, wherein the computer readable program, when executed on a computing device, causes the computing device to:
obtain input data from a plurality of master devices, wherein the plurality of master devices are present at the network edge;
estimate a runtime to run a basic unit operation of deep convolution operations by each of the plurality of master devices;
check a container registry and calculate if speedup inference is achievable using the estimated runtime;
generate depth-wise indices for performing partitions based on an input and output depth of a convolution filter and the container registry;
provide a number of the convolution filters with a pre-defined filter depth;
partition the input data and the deep convolution operations by the plurality of master devices for a first network layer of the deep convolution network based on the number of convolution filters and the filter depth;
transfer the partitioned input data and the deep convolution operations to a plurality of slave devices;
execute a distributed convolution algorithm on the plurality of slave devices;
merge results of the algorithm executed on the plurality of slave devices; and
send the convolutional results to a second network layer, wherein the second network layer is next to the first network layer.

* * * * *